US008171471B1

(12) United States Patent
Daly

(10) Patent No.: US 8,171,471 B1
(45) Date of Patent: May 1, 2012

(54) METHOD AND SYSTEM FOR PERFORMING INITIAL DATA SETUP OF AN APPLICATION

(75) Inventor: Debra Lyn Daly, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 1307 days.

(21) Appl. No.: 11/833,197

(22) Filed: Aug. 2, 2007

(51) Int. Cl.
*G06F 9/445* (2006.01)
(52) U.S. Cl. ....................................................... 717/174
(58) Field of Classification Search ........................ None
See application file for complete search history.

(56) References Cited

U.S. PATENT DOCUMENTS

2005/0125788 A1* 6/2005 Lupini et al. .................. 717/174
2006/0004917 A1* 1/2006 Wang et al. ................... 709/223
2006/0253851 A1* 11/2006 Cho et al. ...................... 717/175
2006/0271463 A1* 11/2006 Young ............................ 705/35
2007/0282654 A1* 12/2007 Sarkar ............................... 705/8

OTHER PUBLICATIONS

My Computer Works. http://www.mycomputerworks.com/. Copyright 2004.*

* cited by examiner

*Primary Examiner* — Wei Zhen
*Assistant Examiner* — Adam R Banes
(74) *Attorney, Agent, or Firm* — Osha • Liang LLP

(57) ABSTRACT

A method for initial data setup of an application that includes installing the application for execution on a computer system, submitting data to a generic edition of the application using guidance from a coach to generate application formatted data, wherein the data is submitted via a network, and storing the application formatted data on the computer system for use by the application executing on the computer system.

20 Claims, 7 Drawing Sheets

METHOD AND SYSTEM FOR PERFORMING INITIAL DATA SETUP OF AN APPLICATION

BACKGROUND

One of the factors that determines whether a user will continue to use an application and purchase upgrades is the initial user experience with the application. Specifically, the initial learning curve and setup time of the application may determine the user's continued use of the application. For example, a user may abandon applications with longer setup times and/or complicated interfaces.

Because of the inherent nature of the functionality provided, certain applications may require a greater learning curve and longer setup times. For example, financial applications may require a user to have both knowledge of financial management and an understanding of how to navigate through the application. With regards to the financial management, the user may need to know how different types of transactions affect the user's accounts. For example, purchases related to a house have different tax implications than purchases for groceries. Similarly, purchases for a first house, or primary residence, may have different tax implications than purchases for subsequent vacation houses. Because a financial application must account for the different types of financial accounts and transactions, the financial application may be inherently complicated. Users that are new to the financial application and/or financial management may have difficulty navigating though the inherently complicated application.

In order to assist a user in learning how to use an application and performing the data setup, a user may obtain assistance provided by the company that developed the application or a third party. For example, certain applications have detailed help files and pop-up boxes to assist users. Applications may also have a tutorial that gives the user an automated guided tour of the application. Further, the user may attend a seminar describing how to use the application.

When the user completes reviewing the help files, pop-up boxes, tutorial or seminar, the user tailors the provided assistance to his/her needs. Specifically, the user identifies how the assistance is applicable, and submits data to the application accordingly.

SUMMARY

In general, in one aspect, the invention relates to a method for initial data setup of an application that includes installing the application for execution on a computer system, submitting data to a generic edition of the application using guidance from a coach to generate application formatted data, wherein the data is submitted via a network, and storing the application formatted data on the computer system for use by the application executing on the computer system.

In general, in one aspect, the invention relates to a system for initial data setup of an application that includes a generic edition of the application configured to generate application formatted data, and an interface configured to transfer an instruction from a coach to a user, receive data for the generic edition of the application from the user, wherein the user generates the data under the guidance of the instruction, and transfer the application formatted data to a computer system of the user, wherein the application formatted data is used by the application.

In general, in one aspect, the invention relates to an application programming interface for performing initial data setup of an application, the application programming interface comprising instructions for transferring an instruction from a coach to a user, wherein the user generates data under the guidance of the instruction, receiving the data for a generic edition of the application from the user, wherein the generic edition of the application generates application formatted data based on the data received from the user, and transferring the application formatted data to a local computer system of the user, wherein the application formatted data is used by the application executing on the computer system of the user.

Other aspects of the invention will be apparent from the following description and the appended claims.

DETAILED DESCRIPTION

Figure 1:
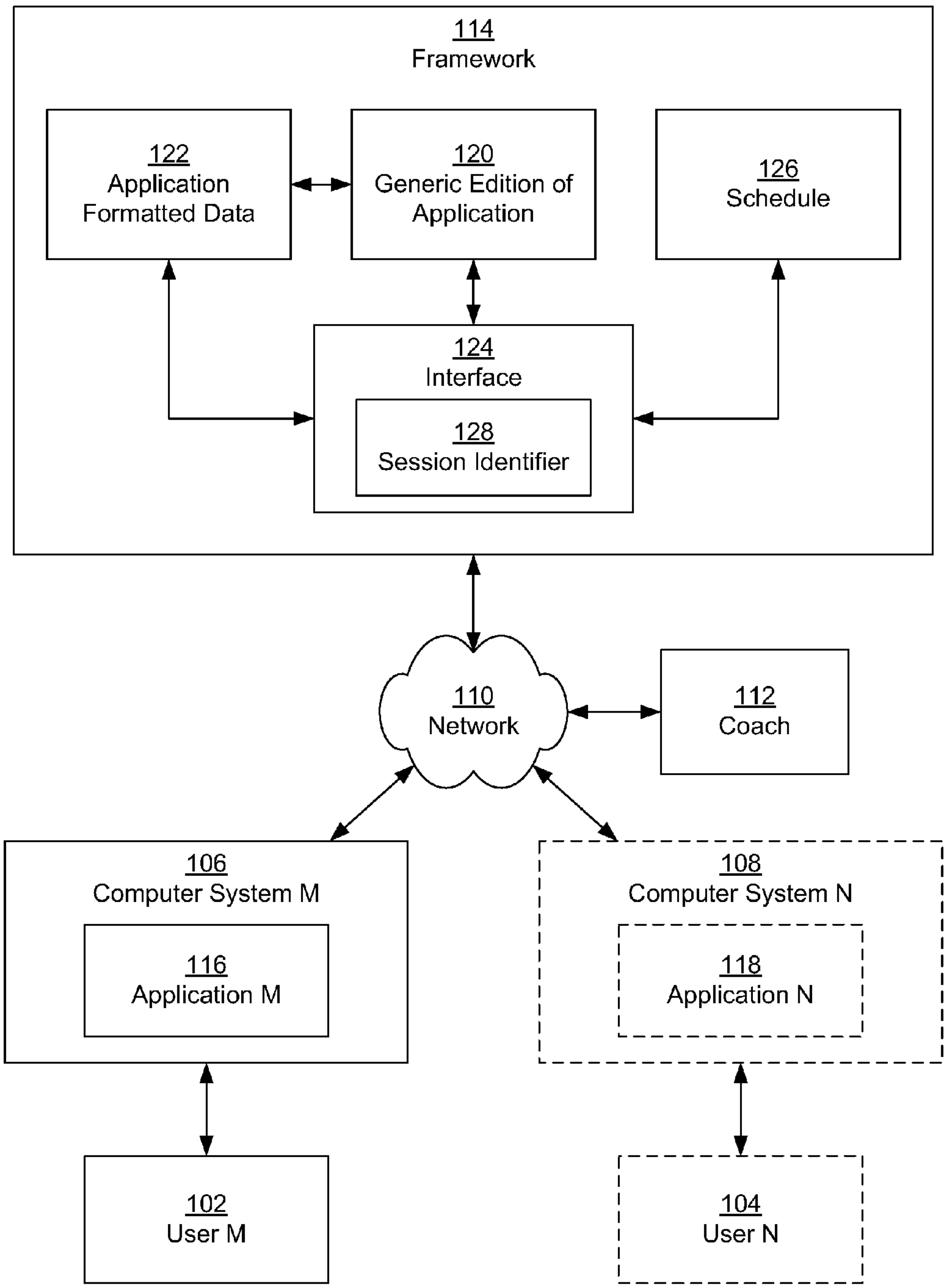
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for performing initial data setup of an application. Specifically, embodiments of the invention allow a user to interact with a coach using a generic edition of the application to perform the data setup. Once the user and the coach perform the data setup using the generic edition of the application, the user may obtain a copy of the data and use the data on the application that the user executes. Embodiments of the invention may perform the translation of the data from the generic edition of the application to the edition used by the user.

A user as used herein may be any individual, entity, or group of individuals or entities that perform the installation, maintenance, and/or use of the application. For example, the user may be a person, a representative of a company, an information technology specialist operating on behalf of the company, or any other such user.

FIG. 1 shows a schematic diagram of a system in accordance with one or more embodiments of the invention. As shown in FIG. 1, the system includes an application (e.g., application m (116), application n (118)) for executing on a computer system (e.g., computer system m (106), computer system n (108)), a network (110), a coach (112), and a framework (114). Each of these components is described below.

In one or more embodiments of the invention, the application (e.g., application m (116), application n (118)) is any type of software that requires a setup of data. The data in the setup is any type of data which is used by the application when the application is executed. For example, the data may be data to access accounts (e.g., financial accounts, email accounts, network accounts), data defining user preferences, data to access other applications, or any other such data.

In one or more embodiments of the invention, the application (e.g., application m (116), application n (118)) is a specific edition. The edition of the application (e.g., application m (116), application n (118)) defines the functions performed by the application (e.g., application m (116), application n (118)) when executed for the user (e.g., user m (102), user m (104)). For example, separate editions of an application for professionals, families, or businesses may exist. Further, editions may be designed to provide increased or minimal functionality from other editions. Thus, a user (e.g., user m (102), user m (104)) may purchase, license, or otherwise obtain the edition of the application (e.g., application m (116), application n (118)) that suits the needs of the user (e.g., user m (102), user m (104)).

In one or more embodiments of the invention, the application (e.g., application m (116), application n (118)) executes on one or more computer systems (e.g., computer system m (106), computer system n (108)). Specifically, the application (e.g., application m (116), application n (118)) may execute locally (e.g., on the user's computer system), remotely (e.g., a computer system on a network, user's or otherwise), or a combination thereof. The computer system (e.g., computer system m (106), computer system n (108)) may be a stationary or mobile device, such as a cellular telephone, personal digital assistant, laptop, Geo-positioning system, etc, or a stationary device. The computer system (e.g., computer system m (106), computer system n (108)) is connected to a network (110).

In addition to the computer system (e.g., a computer system on a network, user's or otherwise), a coach (112) and a framework (114) are connected to the network (110). A coach (112) is any individual or automated system that includes functionality to provide assistance tailored to the user (e.g., user m (102), user n (104)). The coach (112) may be an individual who is unknown to the user prior to coaching the user. The coach (112) includes functionality to communicate with the user and provide remote assistance to the user. Specifically, the coach includes functionality to answer questions for or respond to concerns of the user. Further, in one or more embodiments of the invention, delay exists from the time the coach provides the communication to the time the user receives the communication. For example, any delay may be a result of transmission, response time of the coach, and/or review of the communication. The review may be a third party review or a self-review, such as to ensure that the communication conforms with any requirements of the company (e.g., information provided is correct, the communication only includes approved language). To the user, the coach may appear as real-time provider of information.

In one or more embodiments of the invention, the coach (112) communicates with the user (e.g., user m (102), user n (104)) via the framework (114) and the computer system (e.g., computer system m (106), computer system n (108)). Specifically, the framework (114) provides a mechanism for both the user and the coach to communicate to perform the data setup of the application. The framework (114) includes a generic edition of the application (120), application formatted data (122), an interface (124), and a schedule (126) in accordance with one or more embodiments of the invention.

In one or more embodiments of the invention, the generic edition of the application (120) is an edition of the application that has the features that are common to some or all editions of the application. For example, if application m (116) is a home edition of the application and application n (118) is a business edition of the application, then the generic edition of the application has only the features of the application common to both the home edition and the business edition.

In alternative embodiments of the invention, multiple generic editions of the application may exist. For example, one generic edition of the application may exist that includes features common to all editions for business entities (e.g., enterprise editions, small-business edition, or business edition), and another generic edition may exist that includes features common to personal or family based editions (e.g., home edition, or basic edition).

In one or more embodiments of the invention, the generic edition of the application is simultaneously viewable by the coach (112) and the user (e.g., user m (102), user n (104)). Specifically, the coach (112) is able to view the information about the data that the user submits and the user (e.g., user m (102), user n (104)) is able to see instructions from the coach (112). The generic edition of the application (120) includes functionality to generate application formatted data (122) in accordance with one or more embodiments of the invention. Application formatted data (122) is the setup data that is user-specific and has been submitted to the generic edition of the application. When stored in the framework, the application formatted data (122) may be formatted for the generic edition of the application (120) or for the edition of the application that may be executed on the computer system (e.g., computer system m (106), computer system n (108)). The application formatted data (122) may be stored in the framework (114) temporarily, such as in a cache, or persistently until erased by the framework (114), coach (112), or the user (e.g., user m (102), user n (104)).

In addition to application formatted data (122), the framework (114) also includes an interface (124) in accordance with one or more embodiments of the invention. In one or more embodiments of the invention, the interface (124) includes functionality to control access to the application formatted data (122) and the generic edition of the application (120). Specifically, in one or more embodiments of the invention, the interface (124) includes functionality to allow the coach (112) and the user (102) to simultaneously view the generic edition of the application while the data setup of the generic edition of the application is performed. In particular, input from the user may be visible to the coach and input from the coach may be visible to the user in accordance with one or more embodiments of the invention.

In one or more embodiments of the invention, the interface (124) may limit the application formatted data (122) that is visible to the coach. Specifically, the interface (124) may hide sensitive information, such as social security numbers, bank account numbers, passwords, and other such personal information from the coach. The submission of the sensitive information may be displayed for the coach in a manner so as to indicate that the user input some data, the number of characters of the data, or the type (e.g., letter, number, special character) of characters of the data.

In one or more embodiments of the invention, the interface (124) includes a session identifier (124). The session identifier (128) is a unique key that the coach and the user provides to access the application formatted data (122) and the generic edition of the application (120). Thus, the session identifier (128) is a mechanism for the user and the coach to identify to which coaching session data or instructions are directed.

In one or more embodiments of the invention, the interface (124) is also connected to a schedule (128). A schedule (128) is a storage mechanism for the user to identify when a coach (112) is available and to request an appointment with the coach. The schedule (128) may be maintained for coaches or maintained on a per coach basis. Further, the schedule (128) may be maintained on a per application basis.

One skilled in the art will appreciate that while FIG. 1 shows one possible configuration for performing initial data setup of an application, other configurations may also be used without departing from the scope of the invention. For example, the user may access the framework using a separate computer system than the computer system that executes the application. In another example, the coach may maintain the schedule personally rather than or in addition to the framework maintaining the schedule. In such scenario, a user may arrange to meet with the coach by communicating directly with the coach. The above is only a few examples of different configurations that may be used.

FIGS. 2-5 show flowcharts of a method in accordance with one or more embodiments of the invention. While the various steps in these flowcharts are presented and described sequentially, one of ordinary skill will appreciate that some or all of the steps may be executed in different orders and some or all of the steps may be executed in parallel.

In one or more embodiments of the invention, only a subset of the users who obtain the application may be offered free coaching. Coaching may not be available or may be available only on a price basis to consumers not in the subset. Determining which users are in the subset offered coaching may be based on how the users obtained the application. For example, users who obtain the application from certain retail locations or geographic areas may be targeted for inclusion in the subset. Alternatively, the determination may be based on parameters about the user, such as income, education level, home or work address, employment position, whether the user has personally filed a tax return, the user's admitted comfort level with the subject matter of the application, or other relevant parameters. The parameters about the user may be obtained, for example, via a questionnaire, registration, public records, or other such method.

Figure 2:
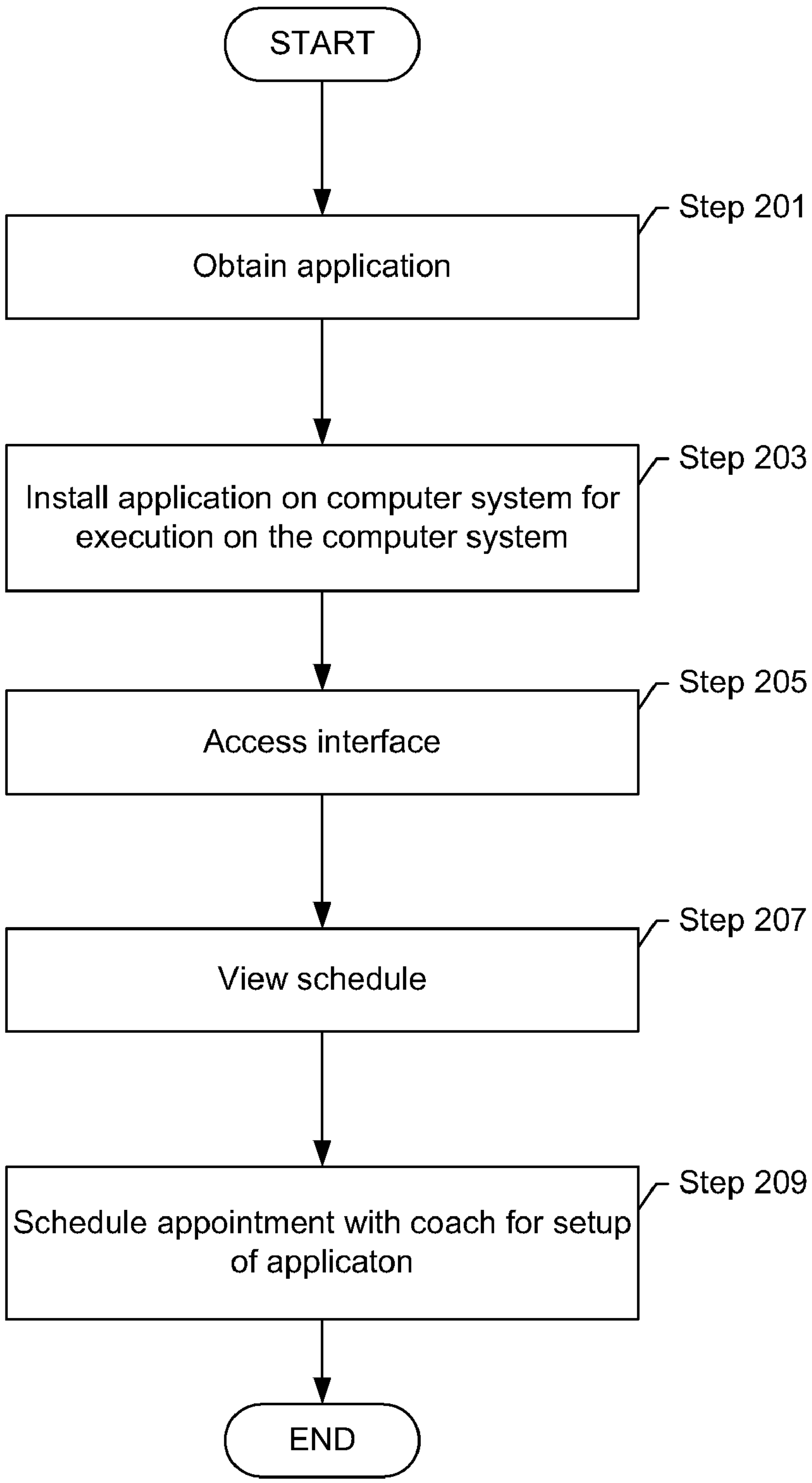
FIGS. 2-5 show flowcharts of a method in accordance with one or more embodiments of the invention.

FIG. 2 shows a flowchart of a method for a user to initiate performing data setup of an application in accordance with one or more embodiments of the invention. Initially, the user obtains the application (Step 201). The user may obtain the application using virtually any method known in the art, such as by downloading one or more installation files from a network, purchasing the application in a retail outlet, being mailed the application, or any other method for optioning an application.

Next, the application is installed on a computer system for execution on the computer system (Step 203) in accordance with one or more embodiments of the invention. Specifically, the user or another individual on behalf of the user may install the application. In one or more embodiments of the invention, while the user is installing the application, the user is offered a coaching session. For example, a window or text box that informs the user of the coaching session may be displayed. The offer may also be on the box, in a booklet or other guide that is provided to the user when the user obtains the application. The offer may specify how the user can arrange the coaching session, such as by selecting a link, accessing an Internet address, or using a contact telephone number. Alternatively, the user may be offered the coaching session when the user obtains the application. In another alternative, the user may be offered the coaching session after registration or if the user contacts customer support with questions indicating confusion or frustration with the application.

Regardless of when the user is offered the coaching session, the user accesses the interface of the framework (Step 205). The user may access the interface, for example, by selecting a link, using an Internet address, or dialing a phone number. At this stage, the user may be requested to provide administrative information, such as the user's name, serial number of application, product registration number, contact information, or other such administrative information. Further, the user may be requested to provide a username and password that will be used to access the coaching session. Alternatively, a security key may be assigned to the user.

In one or more embodiments of the invention, the user views a schedule (Step 207). From the schedule, the user may specify one or more times that are convenient for the user to have the coaching session. Rather than viewing a schedule, the user may be contacted to schedule an appointment. For example, the coach, an assistant or automated system may contact the user to schedule the appointment. Accordingly, the user schedules an appointment with the coach for data setup of the application (Step 209).

Figure 3:
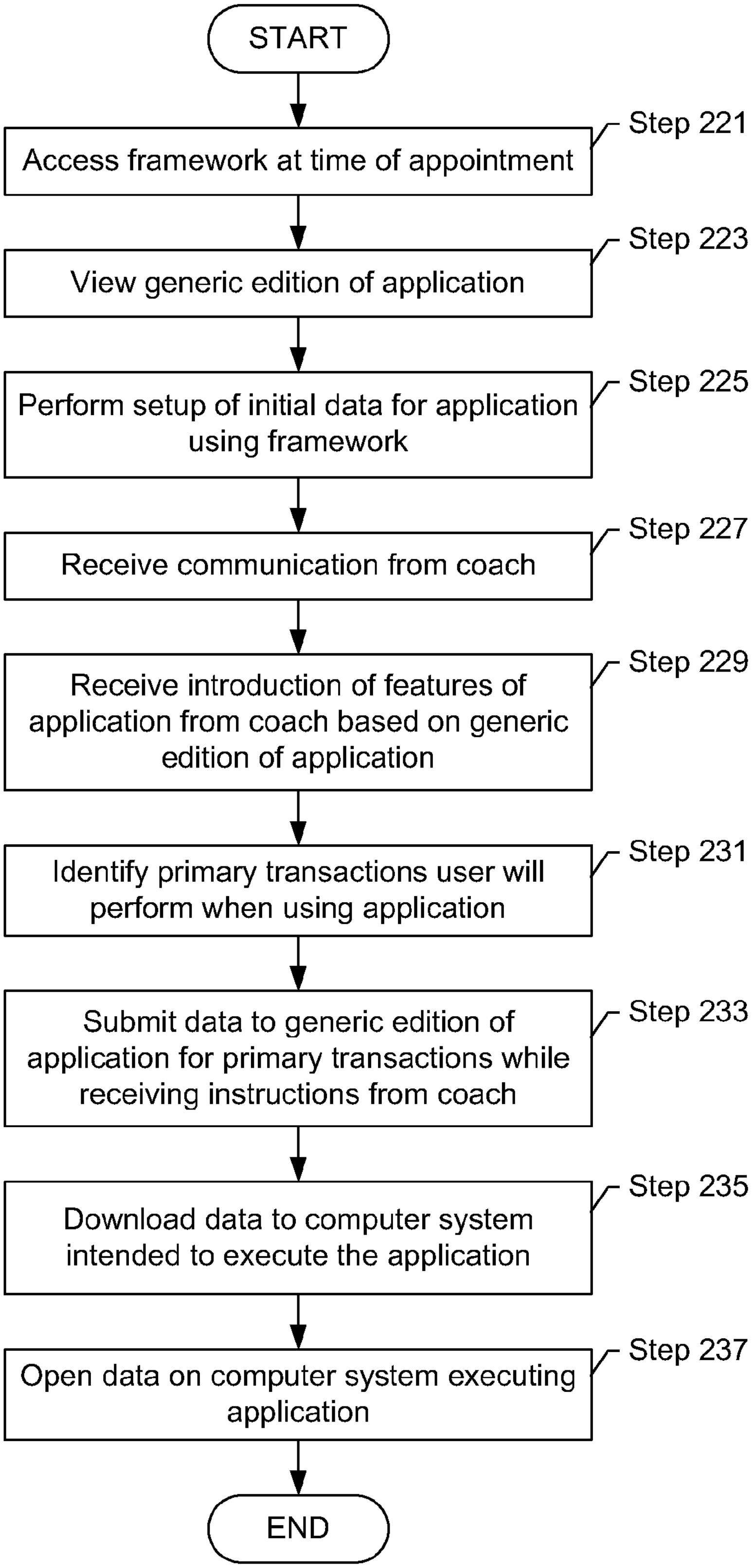

FIG. 3 shows a flowchart of a method for a user to perform data setup of an application with a coach in accordance with one or more embodiments of the invention. Initially, the user accesses the framework at the time of the appointment (Step 221). When accessing the framework, the user may be requested to provide authentication information, such as a username/password and/or a security key.

After accessing the framework, the user views a generic edition of the application (Step 223). The generic edition of the application may appear similar to the edition of the application that is to be executed on the user's computer system, but may have certain features removed. Thus, the environment provided by the generic edition of the application may have a modification in accordance with one or more embodiments of the invention. In one or more embodiments of the invention, performing data setup of the application with a live coach may not be continuous. For example, a user or coach may take a break from the coaching session. In such scenario, the user or coach may halt or stop the session and re-access the framework at a later time.

Continuing with FIG. 3, when viewing the generic edition of the application, the user performs the setup of initial data for the application using the generic edition (Step 225). For example, the user may be guided through an online interview that requests initial information, such as account information, name of business, or other initial information.

During or after the initial setup, the user receives communication from the coach (Step 227). The communication may be via a telephone, messaging in the interface, or the generic edition of the application, or using any other form of communication. In the process of communicating with the coach, the user receives an introduction of features based on the generic edition of the application (Step 229). For example, the coach may show the user how to find help documents, different menu options that are available, how to modify the initial information. The user may receive the introduction by viewing steps the coach performs on the generic edition of the application while listening to the coach. Specifically, in one or more embodiments of the invention, the user may view changes in the generic edition of the application as the coach selects menu options or otherwise indicates portions of the application to which the coach is referring.

Further, the user identifies the primary transactions that the user may perform when using the application (Step 231). The primary transactions may be the transactions that the user is most likely to have difficulty with, transactions that the user anticipates using most often, or transactions that are the most important to the user to perform correctly. The type of primary transactions may be based on the type of application. For example, a financial application may have primary transactions, such as performing a payroll operation, filing taxes, creating an expense report, creating an invoice. In another example, a networking application may have primary transactions of adding authorized users, configuring security, or installing a program using the application. In one or more embodiments of the invention, the coaching session allows the user to specify up to a specific number of primary transactions. For additional primary transactions, the user may be required to pay a fee and/or schedule an additional appointment.

In one or more embodiments of the invention, the user submits data to the generic edition of the application for the primary transactions while receiving instructions from the coach (Step 233). For example, the user may view and/or listen to the coach as the coach guides the user through the primary transactions. When the user is submitting data to the generic edition of the application, the coach may inform the user of the type of data that the application requires. For example, if a field in an application expects a nine digit numeric input, the coach may inform the user that the nine digit numeric input is expected. In such scenario, the coach may proceed to inform the user how to change the format of their data to reflect the nine digit numeric input, such as to not include hyphens when submitting the data.

After successfully submitting all setup data to the generic edition of the application, and performing all primary transactions, the user downloads the data to the computer system intended to execute the application in accordance with one or more embodiments of the invention (Step 235). At this stage, the data may be reformatted for the particular edition of the application that is on the user's computer system. Downloading the data may include the coach informing the user where to store a data file having the data. For example, the coach may specify that the user should store the data file in one of the directories for the application.

Next, the data is opened on the computer system intended to execute the application (Step 237). In one or more embodiments of the invention, the application is opened and a data file having all or part of the user's data is opened. The user may subsequently access the data, modify the data, and use the application. Thus, the initial data setup of the application may be considered completed in accordance with one or more embodiments of the invention.

Figure 4:
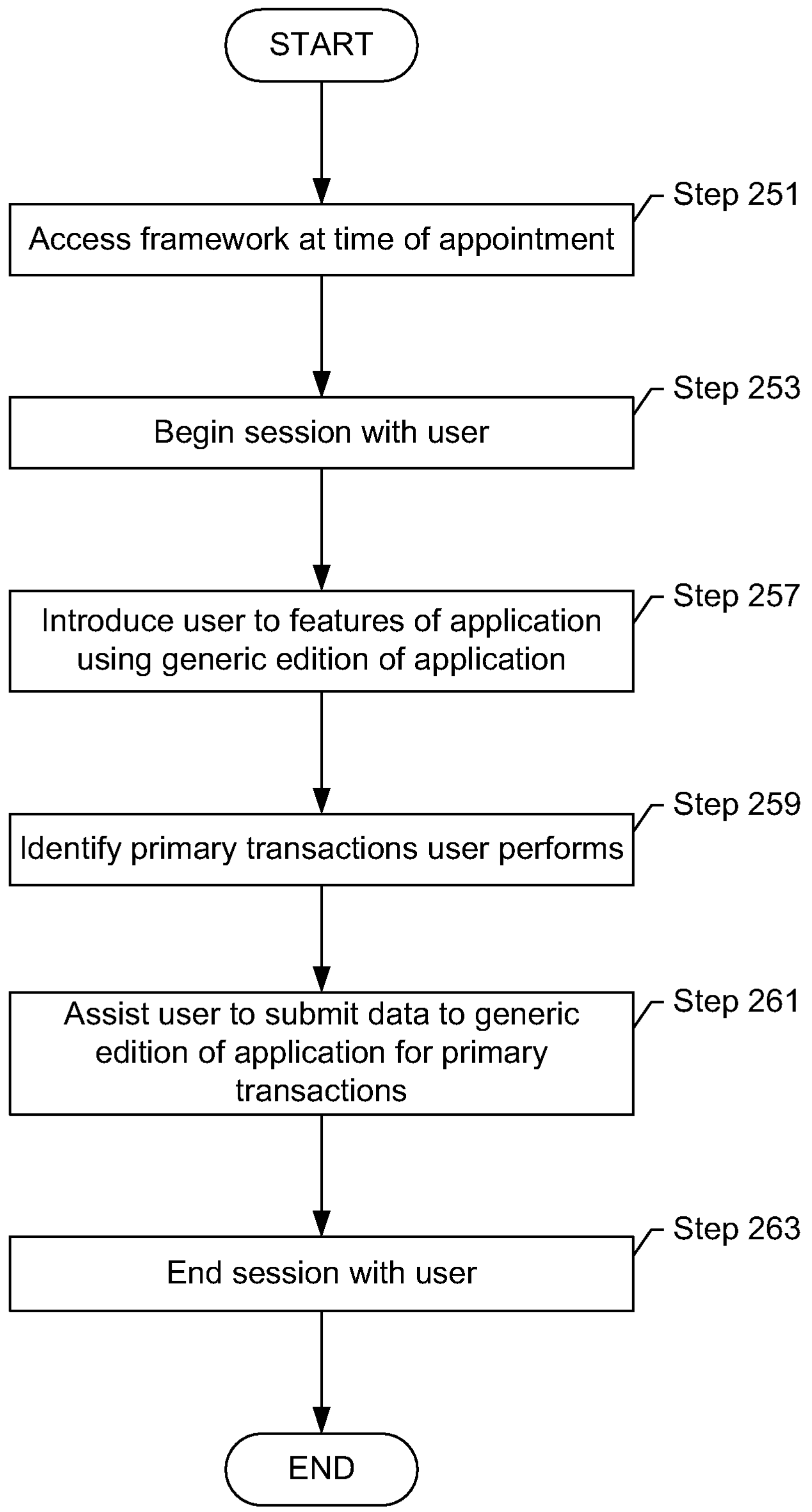

FIG. 4 shows a flowchart of a method for a coach to perform initial data setup of an application with a user in accordance with one or more embodiments of the invention. Initially, the coach accesses the framework at the time of the appointment (Step 251). The coach may access the framework in a similar method to the user. In one or more embodiments of the invention, the coach has a different interface that the coach may use to access the framework. For example, the interface for the coach may include coaching tools, such as virtual drawing instruments, coaching manuals, and tools to initiate communication.

After accessing the framework, the coach begins the session with the user (Step 253). In one or more embodiments of the invention, the coach uses the session identifier to specify to which user communication is directed. Next, the coach introduces the user to features of the application using the generic edition of the application (Step 257). Specifically, the coach may select menu options, drop down boxes, highlight portion of the application using a highlighting tool, or draw on certain portions of the application using various drawing tools. Because the coach is in communication with the user, the coach is able to provide a tailored introduction to the features of the application.

Continuing with FIG. 4, the coach identifies the primary transactions that the user performs (Step 259). When identifying the primary transactions, the coach may ask relevant questions of the user to assist the user in identifying different transactions that the user might want to perform using the application. For example, the coach may ask about the type of business that the user owns and whether in general business transactions, the user provides estimates to customers. In such scenario, the coach may identify to the user that one of the primary transactions is assisting the user to provide an estimate to the customer.

Once a primary transaction is identified, the coach assists the user to submit data to the generic edition of the application for the primary transaction (Step 261). Specifically, the coach may indicate how to do the primary transaction using a computer system of the coach. For example, if the user is having difficulty identifying the type of data that is to go into a field, the coach may ask questions of the user that guide the user to the correct type of data. Further, the user may request assistance of the coach. Additionally, the coach may use a pointer and modify the generic edition of the application to show the user what needs to be selected to perform the function. For example, the coach may circle a menu option on the generic edition of the application and have the circle propagated to the computer system of the user via the framework in accordance with one or more embodiments of the invention. Specifically, the framework may register the circle in the generic edition of the application and send a command to the user's computer to update the display.

After performing the primary transactions, the coach ends the session with the user (Step 263). Ending the session with the user may include informing or assisting the user in downloading the data to the computer system that is intended to execute the application. Further, the coach may inform the user of how to obtain assistance in the future.

Figure 5:
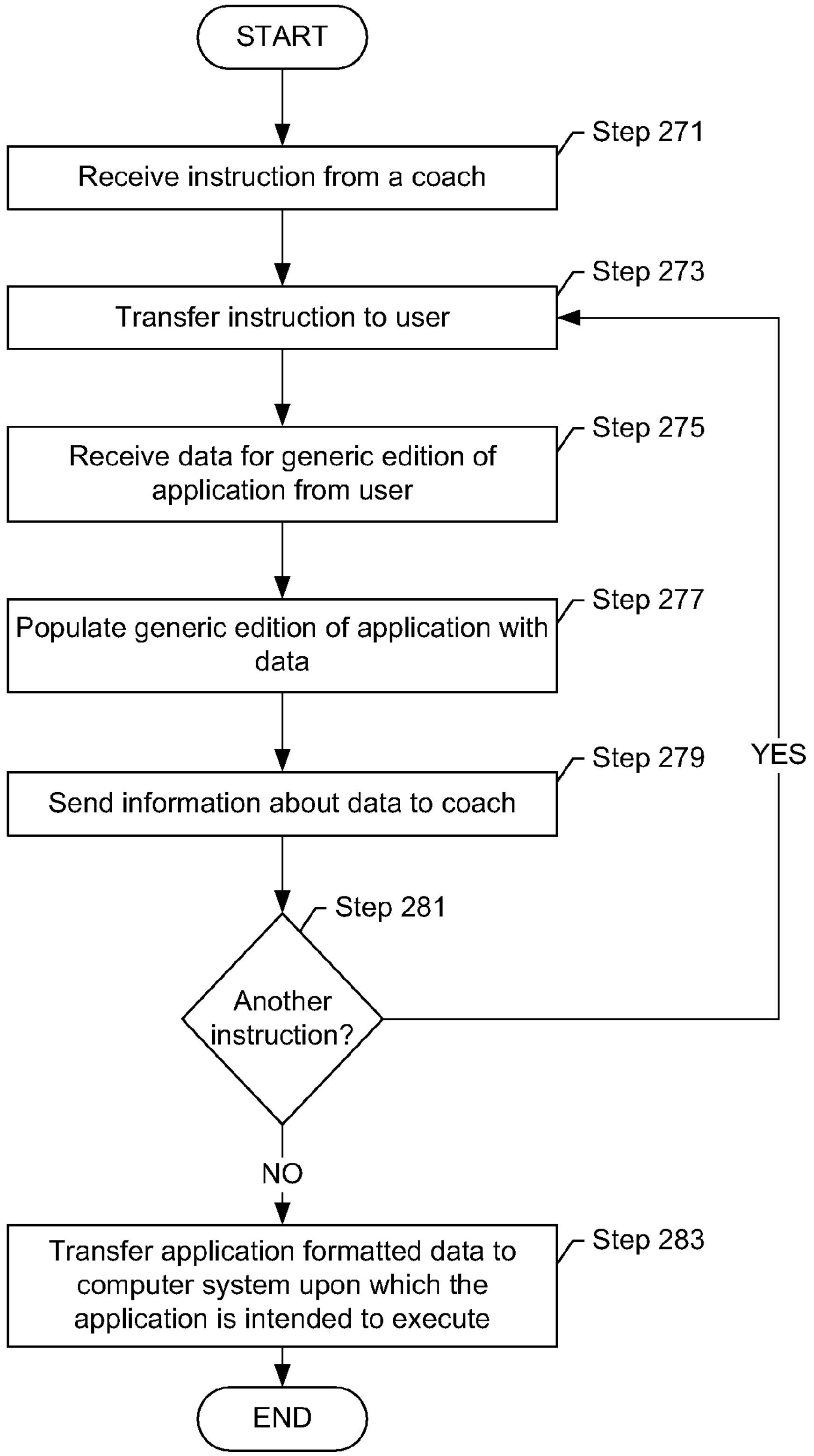

FIG. 5 shows a flowchart of a method for a framework to perform initial data setup of an application in accordance with one or more embodiments of the invention. Once the framework authenticates the user and the coach, the framework may receive an instruction from the coach for the user (Step 271). The instruction from the coach may be received by an event process on a computer system that the coach is using. The event process may include functionality to detect input from the coach and perform any function according to the input. For example, if the coach is drawing on the generic edition of the application (e.g., by using a virtual drawing tool), then the event process may create an event that informs the framework of the instruction. The framework transfers the instruction to the user (Step 273).

Based on the instruction, framework may receive data for the generic edition of the application from the user (Step 275). For example, an event process on the user's computer may create an event that informs the framework that new data exists. Accordingly, the framework populates the generic edition of the application with the data (Step 277). Further, the framework may send information about the data to the coach (Step 279). The information about the data may include the data itself, code identifying the type of data submitted, code identifying the number of characters submitted, or code identifying whether data is submitted.

Next, a determination is made about whether another instruction is received from the coach (Step 281) in accordance with one or more embodiments of the invention. If another instruction is received from the coach, then the instruction is transferred to the user in accordance with one or more embodiments of the invention. Similarly, while not shown, if data is received from the user, then information about the data may be transferred to the coach in accordance with one or more embodiments of the invention.

At the end of the session between the user and the coach, the framework transfers the application formatted data to the computer system of the user where the application is intended to execute (Step 283). Specifically, the framework may receive a request for the application formatted data from the computer system of the user. After receiving the request, the framework may authenticate the user when the user is not previously authenticated.

In accordance with one or more embodiments of the invention, the framework may identify the edition of the application executing on the computer system of the user. Additionally, the framework or the application may format the application formatted data for the edition of the application obtained by the user.

In the following example, consider the scenario in which a small business owner decides to buy QuickBooks® financial application (QuickBooks is a registered trademark of Intuit, Inc., located in Mountain View, Calif.). While reading the user manual located in the box with the financial application, the small business owner (i.e., the user) sees a Uniform Resource Locator (URL) for a website that offers free training. Accordingly, the user accesses the website by typing in the URL for the free training registration.

At the website, the user is instructed to provide a name, phone number, email address, and product registration number. The user is also requested to provide the best manner to contact the user for the training session and told that a customer representative will contact the user within a specified time frame. When the customer representative contacts the user, the customer representative asks questions of the user in order to determine the best coach for the user. At the end of the conversation, the customer representative sends an email to the user with an appointment date, time, URL of training website, and session identifier.

At the time of the appointment, the user logs into the training website by providing the session identifier. At the scheduled time, the coach also logs onto the website. At this stage, the user may view an introduction screen of the generic edition of the application within the website. Simultaneously, the coach views the same display as the user and can communication with the user. At this stage, the user may use an interview provided by the generic edition of the website to submit initial data, such as the name of the business.

While the user is answering questions in the EasyStep interview, the coach is able to see the type of data that the user is submitting to the generic edition of the application. For example, if the user is submitting bank account numbers, the coach may only see a number sign (e.g., #, N) or an input identifier. When the user is submitting non-sensitive information, such as the company name, the coach may view the exact data that the user submits. Accordingly, if the user is uncertain about an EasyStep interview question, the coach can see exactly where the user is in the EasyStep interview and answer the users question accordingly. Further, if the coach notices that the type of data is incorrect, then the coach can instruct the user accordingly. Thus, while protecting the user's confidential information, the training website provides a mechanism for the coach to view that which the user is entering.

Continuing with the example, once the user completes the EasyStep interview with the coach, the user may see the QuickBooks® financial application Home page interface with the user's information. Accordingly, the coach may provide guidance about the Home page interface. For example, the coach may instruct the user how to obtain help in the future. Accordingly, the coach may direct the user to the help files. For example, FIG. 6 shows an example screenshot of the training website (300) with the help files that are simultaneously displayed for both the user and the coach in accordance with one or more embodiments of the invention.

Figure 6:
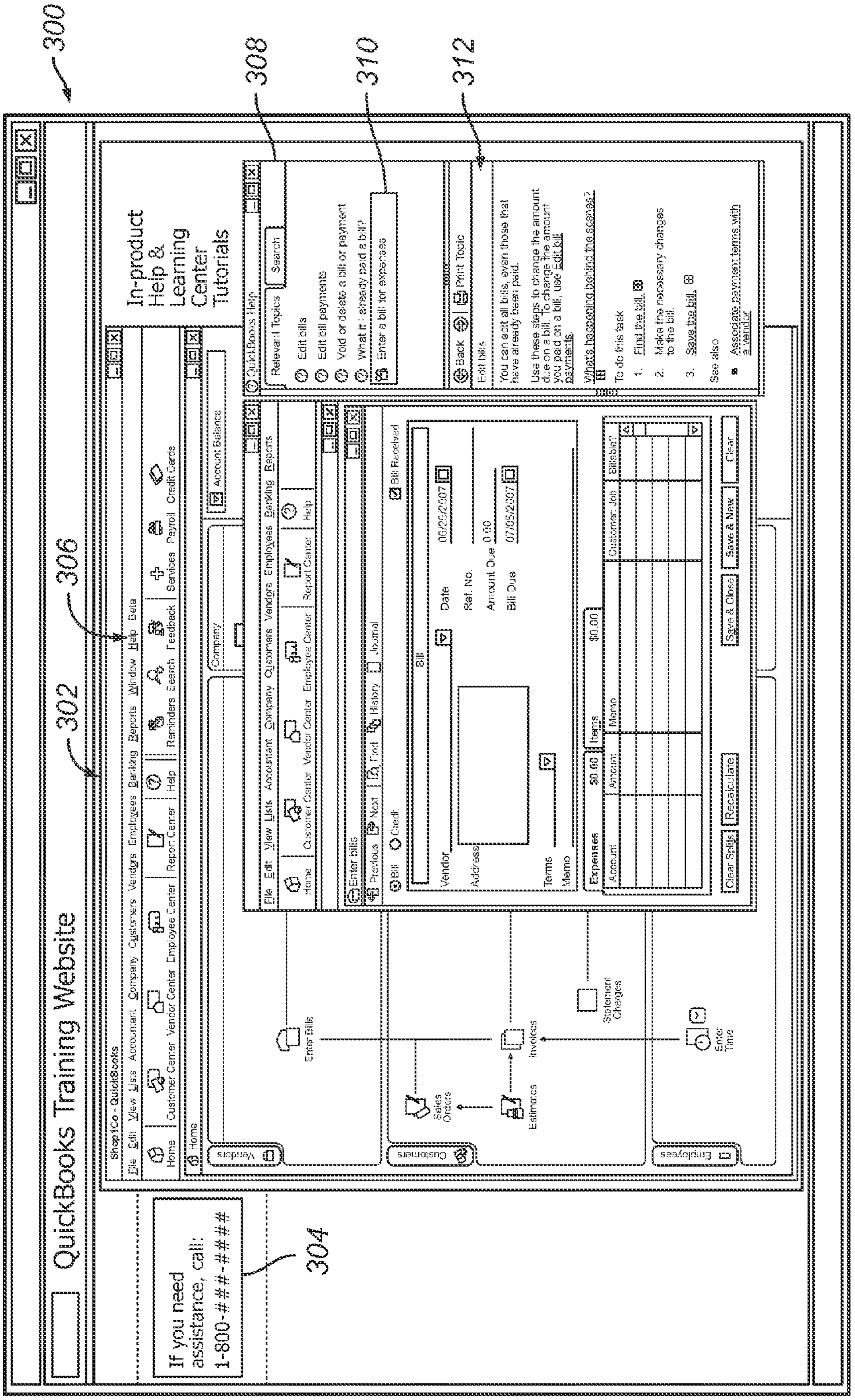
FIG. 6 shows an example interface in accordance with one or more embodiments of the invention.

As shown in FIG. 6, the training website (300) includes a pane with the generic edition of the application (302) and a secondary phone number (304) that may be called if the user and the coach loose connection. When the user views the generic edition of the application (302), the user may not know how to obtain help for entering a bill for expenses. In such scenario, the coach may first instruct the user to go to the help menu (306) and open a help window (308). If the user does not see the help menu (306) on the screen, the coach may move the mouse pointer for the user to the help menu (306).

Next, the coach instructs the user to view the help window (308) that is displayed. The coach may put a box (310) around the option in the help window to indicate the particular help option (e.g., "Enter a bill for expenses) for the user to select. Once the user selects the option, the user is able to view the help pane (312) or launch a tutorial video.

Additionally, the coach may also provide information about primary transactions. For example, the user may state that she bought QuickBooks® financial application to simplify payroll. Accordingly, the coach may instruct the user to the menu option and the steps to perform the payroll. While the user is performing the actions, the coach may view the selections of the user and provide guidance, if necessary.

At the end of the training session, the user uses the training website to download the newly created application formatted data to the computer system of the user. When downloading the application formatted data, the coach may instruct the user on which folder to place the application formatted data. When the user executes her edition of QuickBooks® financial application on her computer system, the user is able to open the application formatted data. Thus, under the guidance of the coach, the user has performed the initial data setup of her edition of QuickBooks® financial application.

As shown in the example, because the user and the coach can view the same screen, the coach is able to see where the user is in the generic edition of the application. When words and text are insufficient to provide guidance, the coach may take control of the mouse from the user. Further, the coach may use additional indication tools, such as the rectangular box. Thus, even though the coach is remote from the user and is generally unknown to the user, the coach may effectively guide the user.

Figure 7:
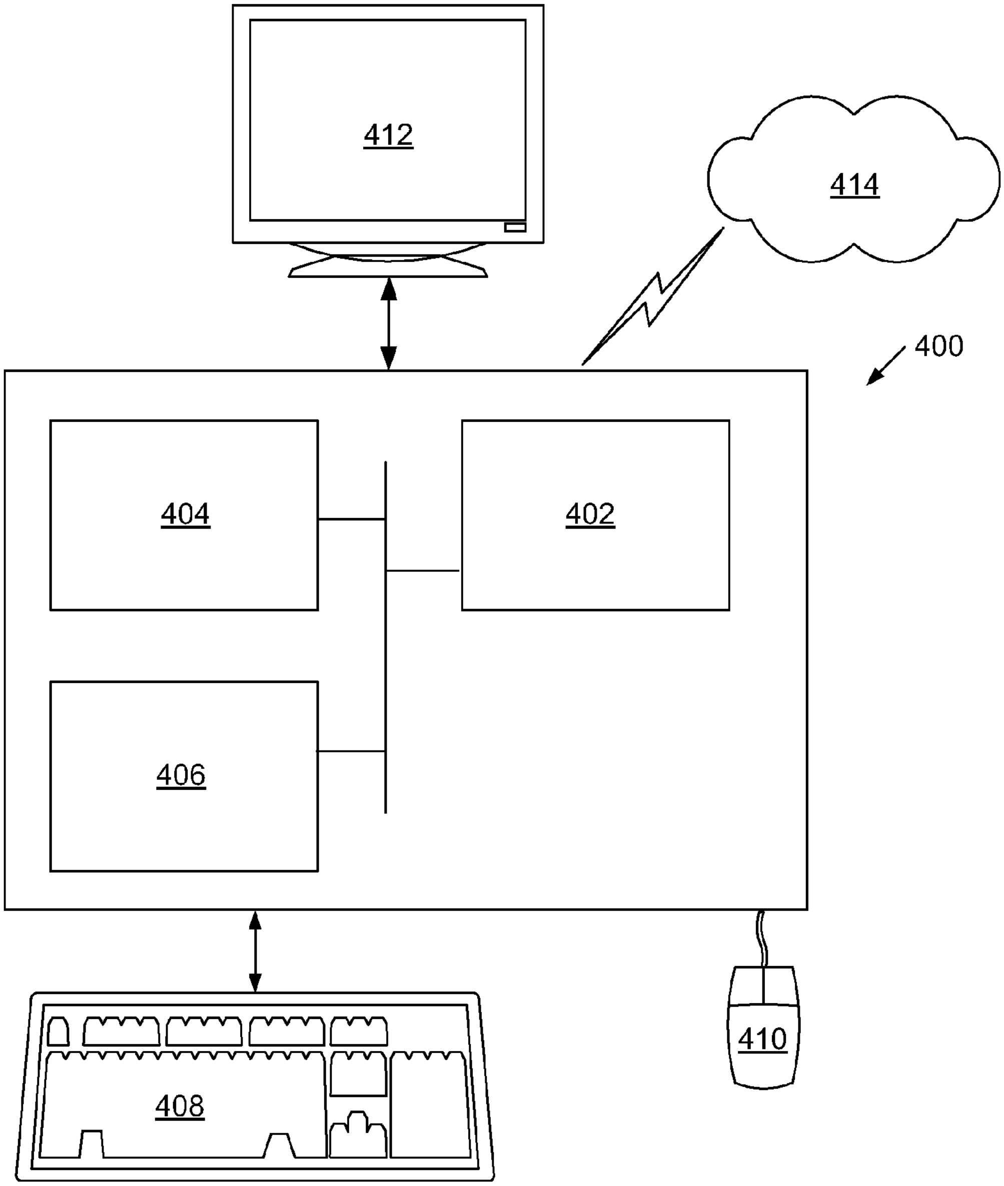
FIG. 7 shows a computer system in accordance with one or more embodiments of the invention.

The invention may be implemented on virtually any type of computer regardless of the platform being used. For example, as shown in FIG. 7, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (414) via a network interface connection (414). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., application formatted data, interface, schedule, generic edition of the application) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for initial data setup of a user's edition of an application comprising:

installing the user's edition of the application for execution on a first computer system;

accessing, by the first computer system via a network, a second computer system executing a generic edition of the application;

receiving, by the first computer system via the network, instructions from a coach for submitting a plurality of initial user data to the generic edition of the application, wherein the plurality of initial user data comprises a personal information input associated with an input type;

submitting, by the first computer system via the network, the initial user data to the generic edition of the application using the instructions from the coach, wherein the submitting of the plurality of initial user data by the first computer system is presented to the coach such that the personal information input is not presented and the input type of the personal information input is presented, and wherein the generic edition of the application uses the initial user data to generate application formatted data;

receiving, by the first computer system via the network, the application formatted data from the generic edition of the application; and executing the initial data setup of the user's edition of the application using the application formatted data on the first computer system.

2. The method of claim 1, wherein the application is a financial application.

3. The method of claim 1, further comprising:

receiving the instructions from the coach is about the plurality of the initial user data to submit to the generic edition of the application.

4. The method of claim 3, wherein the instructions from the coach is provided using one selected from a group consisting of a virtual drawing tool, a highlighting tool, and a selection of a menu option by the coach.

5. The method of claim 1, wherein submitting the plurality of initial user data to the generic edition of the application comprises:

identifying at least one primary transaction to perform with the user's edition of the application; and submitting the plurality of initial user data for the at least one primary transaction to the generic edition of the application while receiving the instructions from the coach.

6. The method of claim 1, further comprising:

receiving an introduction of at least one feature of the user's edition of the application from the coach.

7. The method of claim 1, wherein the generic edition of the application is simultaneously viewable by a user of the first computer system and the coach.

8. The method of claim 1, further comprising:

scheduling an appointment with the coach using a framework, wherein the generic edition of the application executes on the framework.

9. A system for initial data setup of an application comprising:

a first computer system;

a generic edition of the application, executing on the first computer system, configured to generate application formatted data; and an interface configured to:

transfer an instruction from a coach to a user of a second computer system; receive, from the second computer system via a network, a plurality of initial user data for the generic edition of the application, wherein the plurality of initial user data comprises personal information input associated with an input type, and wherein the user submits the plurality of initial user data using the instruction;

present, to the coach, the submitting of the plurality of initial user data such that the personal information input is not presented and the input type of the personal information input is presented;

generate the application formatted data using the initial user data; and transfer, via the network, the application formatted data to the second computer system, wherein the initial data setup of a user's edition of an application is executed using the application formatted data on the second computer system.

10. The system of claim 9, wherein the application is a financial application.

11. The system of claim 9, wherein the instruction from the coach is provided using one selected from a group consisting of a virtual drawing tool, a highlighting tool, and a selection of a menu option by the coach.

12. The system of claim 9, wherein the plurality of initial user data is for at least one primary transaction to perform with the user's edition of the application.

13. The system of claim 9, wherein the interface is further configured to:

transfer an introduction of at least one feature of the user's edition of the application from the coach to the user.

14. The system of claim 9, further comprising:

a schedule configured to be accessed by the interface for the user to schedule an appointment with the coach.

15. The system of claim 9, wherein the user satisfies at least one parameter to receive the instruction from the coach.

16. The system of claim 15, wherein the parameter is one selected from a group consisting of a geographic location of the user, an education level, a type of employment, a name of a retail outlet from which the user bought the user's edition of the application, income, and whether the user has previously filed a tax return.

17. A non-transitory computer readable medium comprising an application programming interface for performing initial data setup of a user's edition of an application, the application programming interface comprising instructions for: transferring an instruction from a coach to a user on a first computer system;

receiving, from the first computer system via a network, a plurality of initial user data for a generic edition of the application executing on a second computer system, wherein the plurality of initial user data comprises personal information input associated with an input type, and wherein the user submits the plurality of initial user data using the instruction;

presenting, to the coach, the submitting of the plurality of initial user data such that the personal information input is not presented and the input type of the personal information input is presented;

generating application formatted data based on the plurality of initial user data received from the user; and transferring, via the network from the second computer system, the application formatted data to the first computer system, wherein the initial data setup of a user's edition of an application is executed using the application formatted data on the first computer system.

18. The non-transitory computer readable medium of claim 17, wherein the user's edition of the application is a financial application.

19. The non-transitory computer readable medium of claim 17, wherein the instruction from the coach is an indication of a portion of the generic edition of the application using one selected from a group consisting of a virtual drawing tool, a highlighting tool, and a selection of a menu option by the coach.

20. The non-transitory computer readable medium of claim 17, wherein the user satisfies at least one parameter to receive the instruction from the coach, wherein the parameter is one selected from a group consisting of a geographic location of the user, an education level, a type of employment, a name of a retail outlet from which the user bought the user's edition of the application, income, and whether the user has previously filed a tax return.

* * * * *